(12) United States Patent
Stern et al.

(10) Patent No.: US 6,795,923 B1
(45) Date of Patent: Sep. 21, 2004

(54) MECHANISM FOR EMBEDDING NETWORK BASED CONTROL SYSTEMS IN A LOCAL NETWORK INTERFACE DEVICE

(75) Inventors: Hal L. Stern, Livingston, NJ (US); Gregory M. Papadopoulos, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/382,265

(22) Filed: Aug. 24, 1999

Related U.S. Application Data

(63) Continuation-in-part of application No. 08/806,327, filed on Feb. 26, 1997, now Pat. No. 5,935,249.

(51) Int. Cl.$^7$ ................................................. G06F 1/24
(52) U.S. Cl. ........................ 713/201; 713/168; 713/182; 713/189; 713/200
(58) Field of Search ................................. 713/201, 168, 713/182, 189, 200

(56) References Cited

U.S. PATENT DOCUMENTS

| | | | |
|---|---|---|---|
| 5,204,961 A | * 4/1993 | Barlow ................... | 395/187.01 |
| 5,321,819 A | * 6/1994 | Szczepanek ............ | 395/200.58 |
| 5,542,046 A | * 7/1996 | Carlson et al. .......... | 713/200 |
| 5,548,721 A | 8/1996 | Denslow ................ | 395/187.01 |
| 5,561,770 A | * 10/1996 | de Bruijn et al. ........ | 709/225 |
| 5,577,209 A | * 11/1996 | Boyle et al. ............ | 395/187.01 |
| 5,579,222 A | * 11/1996 | Bains et al. ............. | 395/712 |
| 5,659,794 A | * 8/1997 | Caldarale et al. ........ | 395/821 |
| 5,678,004 A | * 10/1997 | Thaweethai ............. | 395/187.01 |
| 5,684,957 A | * 11/1997 | Kondo et al. ............ | 713/201 |
| 5,692,124 A | * 11/1997 | Holden et al. .......... | 395/187.01 |
| 5,699,512 A | * 12/1997 | Moriyasu et al. ....... | 395/186 |
| 5,701,411 A | * 12/1997 | Tran et al. .............. | 709/250 |
| 5,720,033 A | * 2/1998 | Deo ....................... | 395/180 |
| 5,764,896 A | * 6/1998 | Johnson ................. | 355/200.8 |
| 5,771,354 A | * 6/1998 | Crawford .............. | 395/200.59 |
| 5,784,609 A | * 7/1998 | Kurihara ................ | 707/9 |
| 5,826,015 A | * 10/1998 | Schmidt ................. | 713/201 |

FOREIGN PATENT DOCUMENTS

| | | | |
|---|---|---|---|
| DE | 19529252.9 | 8/1995 | ........... G06F/17/60 |
| EP | 0718764 | 6/1996 | ........... G06F/11/00 |
| FR | 2667171 | 9/1990 | ............ G06F/9/06 |

* cited by examiner

*Primary Examiner*—Thomas R. Peeso
(74) *Attorney, Agent, or Firm*—Blakely, Sokoloff, Taylor & Zafman LLP

(57) ABSTRACT

A secure, trusted network management function embedded within a network interface device is provided. The network interface device connects a host computer to a network and contains a host bus interface, a network interface, and control logic. The network interface device incorporates a secure language processor, non-volatile memory, and a carrier sense circuit. The secure language processor executes a secure language program, and the non-volatile memory stores identification keys for remote devices and objects of value for network applications. If an application program is to be executed or accessed by the host computer, the secure language processor verifies that the object of value allows such execution or access. If a remote network device attempts to control the functionality of the network interface device, the secure language processor verifies that the remote network device has the authority to issue such a command.

15 Claims, 11 Drawing Sheets

MECHANISM FOR EMBEDDING NETWORK BASED CONTROL SYSTEMS IN A LOCAL NETWORK INTERFACE DEVICE

This application is a continuation-in-part of Ser. No. 08/806,327, filed Feb. 26, 1997, now U.S. Pat. No. 5,935,249.

FIELD OF INVENTION

The present invention relates generally to the field of computer networking, and more particularly to the implementation of secure network management functions within network interface devices.

BACKGROUND OF THE INVENTION

Network interface devices, such as modems and Ethernet controllers provide a physical and logical connection between a network station and a network. Typical network stations include host computers, routers, and network servers. A network interface device is treated as part of the network station's physical and logical structure, on the same logical level as the network station's CPU, memory, and disk devices. A network interface device is also assumed to be a physical or link layer device within the Open Systems Interconnection (OSI) seven layer model of network architecture. The primary function of a network interface device is to translate data contained within the internal memory of the computer into a frame or packet suitable for transmission on the appropriate network, and to perform the reverse conversion upon receipt of a valid frame from the network. Modems, which are considered network interface devices for asynchronous access, may implement link-level data compression and error correction as part of this conversion and transmit/receive process.

The increased use of network applications and environments has led to great increases in the volume of traffic between computers over networks. Not only has the volume of network traffic increased, but the complexity of network transactions has increased as well. Many network applications now allow users to perform commercial or fee-based transactions which require the exchange or payment of money. Such applications often involve the transmission of confidential information, such as credit card or subscriber identification numbers. This increased use and complexity of network applications necessitates greater resource and access control over the computers and routers on a network in order to ensure that network traffic flows efficiently and that messages are transmitted securely. Current network interface devices lack certain essential features which are increasingly being required in modern network environments. These features include the ability to have a remote network station control the network interface of a host computer, and the ability to provide a logical representation of network services even when the host computer is disconnected from the network.

There are currently no Transmission Control Protocol/Internet Protocol (TCP/IP) fielded networked systems that provide secure and reliable in-band, network-based control of network interface devices within network stations. Some systems allow control from the network station to the remote server, for example, a telephone customer using the *69 call return feature to fetch information from the local telephone company switch. However, these systems do not allow remote server or network control over the network interface device within the network station. Such control is useful because it would allow a central network entity to control network traffic characteristics, such as bandwidth usage by stations on the network. However access to the network interface device from devices on the network other than the host computer within which the interface device resides raises several security concerns. Insecure access to the network interface device from the network may allow undesired exposure of data or sensitive information. It may also allow an improper configuration to be set which may result in a misdirection or even loss of data. It is thus desirable to provide a network interface device which allows secure control over operational characteristics of the network interface device from remote devices on the network.

Present networked systems also fail to provide secure and reliable local representation of network services within a network interface device for a host computer. In an environment in which a host computer accesses a fee-based application from a remote server, the network interface device (which is under the complete control of the network station) cannot contain any state information or object of value such as licenses, payment data or electronic rights-to-use, because this information can be modified, created (spoofed) or destroyed by the host computer. In current systems, electronic objects of value are stored in a secure manner on another station on the network, such as the remote server, and the host computer is required to use a network protocol such as Remote Procedure Call (RPC) to acquire the object from the remote server's secure storage system. These systems require that a network connection be maintained between the host computer and remote server during the time that the application is executed on the host computer, and also that the remote server and host computer transmit sensitive information (i.e., the license or payment data) over the network. These systems thus introduce connectivity and security constraints to a network application environment. It is thus further desirable to provide a network interface device which allows secure representation of network services to a host computer even when the host computer is disconnected from the network.

In addition, network interface devices in the prior art have various other disadvantages which are overcome by the present invention, as described in the detailed description which follows.

SUMMARY OF THE INVENTION

The present invention discloses a method and apparatus for securely controlling a local network device from a network, and providing network services to a host computer without requiring a network connection. The network interface device contains a secure language processor. The secure language processor verifies commands sent from the network to the host processor and provides an embedded, robust environment which allows for secure access and control over resources within the network interface device, and the storage of sensitive information within the network interface device.

In one particular embodiment of the present invention, the secure language processor is implemented within a Java™ language interpreter (Java is a trademark of Sun Microsystems). The Java language interpreter utilizes the Java programming language and application level support for digital signatures to receive and verify control commands sent to the host computer from a remote network device. This control command could request the execution of a local function such as a reduction in bandwidth consumption, or the change in network addressing or connectivity. The Java language interpreter also provides control over embedded non-volatile memory for storing objects of value, and a restricted interface. This mechanism allows a network interface device to represent and proxy for services available on a network, even when the local device is disconnected from the network.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals indicate similar elements and in which.

DETAILED DESCRIPTION OF THE INVENTION

A method and apparatus for embedding a secure network management function within a local network interface device is described. In the following description, for purposes of explanation- numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

Hardware Overview

According to the present invention network stations such as host computers, network servers, and network routers transmit messages over a network. Secure network management functions within these network stations allows the control of these stations from remote devices on the network and the proxying of services available on the network.

According to one embodiment, the secure network management functions and other aspects of the present invention are implemented by a processing unit in a network interface device connected to or built into a network station. The processing unit executes a sequence of instructions stored in a memory. The memory may be a random access memory (RAM), read-only memory (ROM), a persistent store, such as a mass storage device, or any combination of these devices. Execution of the sequences of instructions causes the processing unit to perform steps according to the present invention.

The instructions may be loaded into the memory of the network interface device from a persistent store and/or from one or more other host computer systems over a network connection. In some cases, the downloaded instructions may be directly supported by the processing unit. Consequently, execution of the instructions may be performed directly by the processing unit. In other cases, the instructions may not be directly executable by the processing unit. Under these circumstances, the instructions may be executed by causing the processing unit to execute an interpreter that interprets the instructions, or by causing the processing unit to execute instructions which convert the received instructions to instructions which can be directly executed by the processing unit.

In other embodiments, hardwired circuitry may be used in place of, or in combination with, software instructions to implement the present invention. Thus, the present invention is not limited to any specific combination of hardware circuitry and software, nor to any particular source for the instructions executed by the target.

Figure 1:
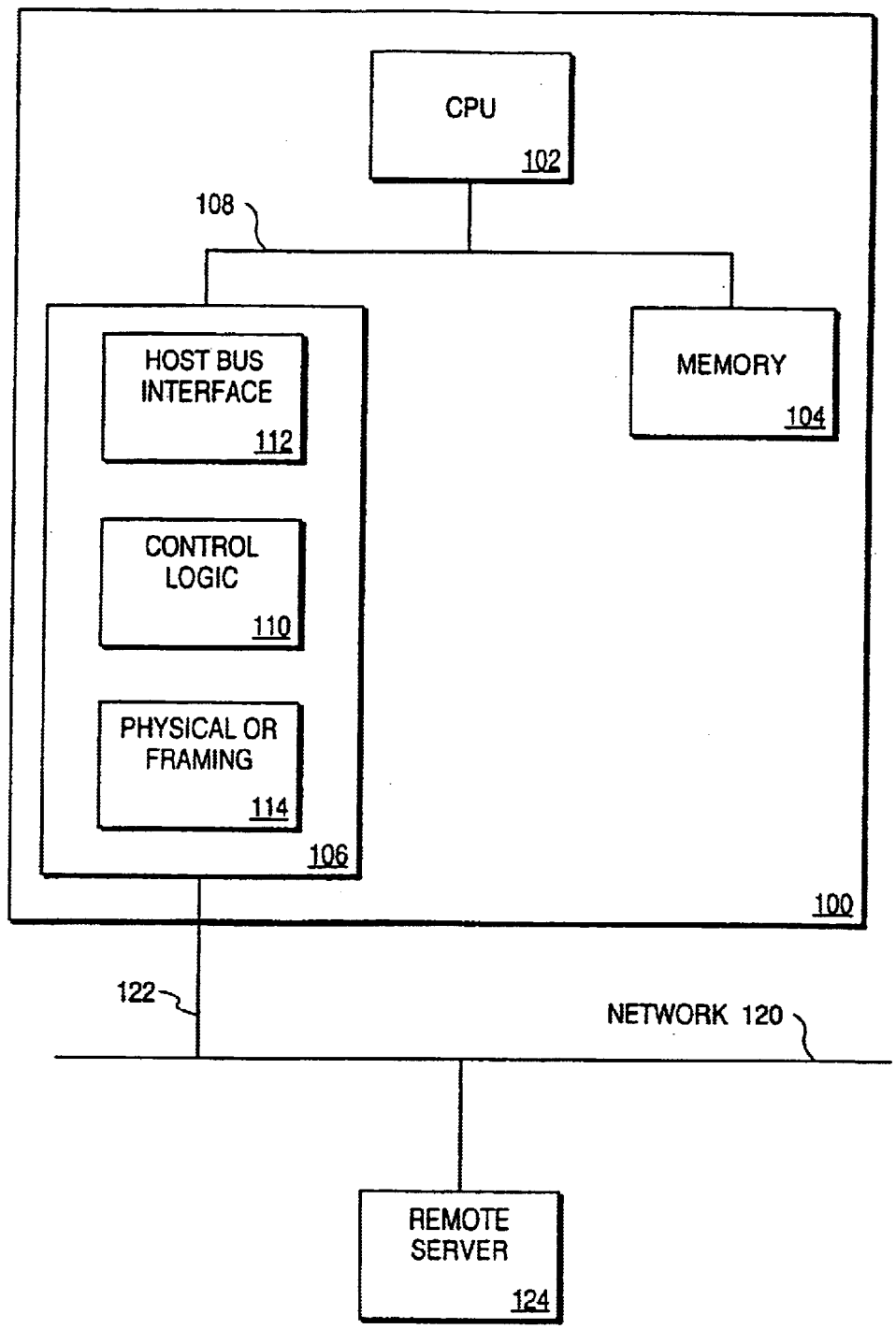
FIG. 1 is a block diagram representation of a prior art network interface device.

FIG. 1 illustrates a typical prior art network interface device. Network station 100 includes a central processing unit (CPU) 102, memory 104, and network interface device 106, all connected by an internal bus 108. Network interface device 106 contains three logical sections, control logic 110, a host bus interface 112, and a physical or framing circuit 114. The network interface device 106 connects network station 100 to network 120 through link 122. Network 120 serves to connect other nodes such as remote server 124 to network station 100. In a typical network configuration, network station 100 could be a host computer or a network router which buffers and transmits messages along the network. In a typical network application environment in which network station 100 is a host computer, network station 100 accesses application programs or data from remote server 124 over network 120. An example of such an application would be a user accessing a World-Wide-Web page from a remote server, on a local personal computer.

Figure 2:
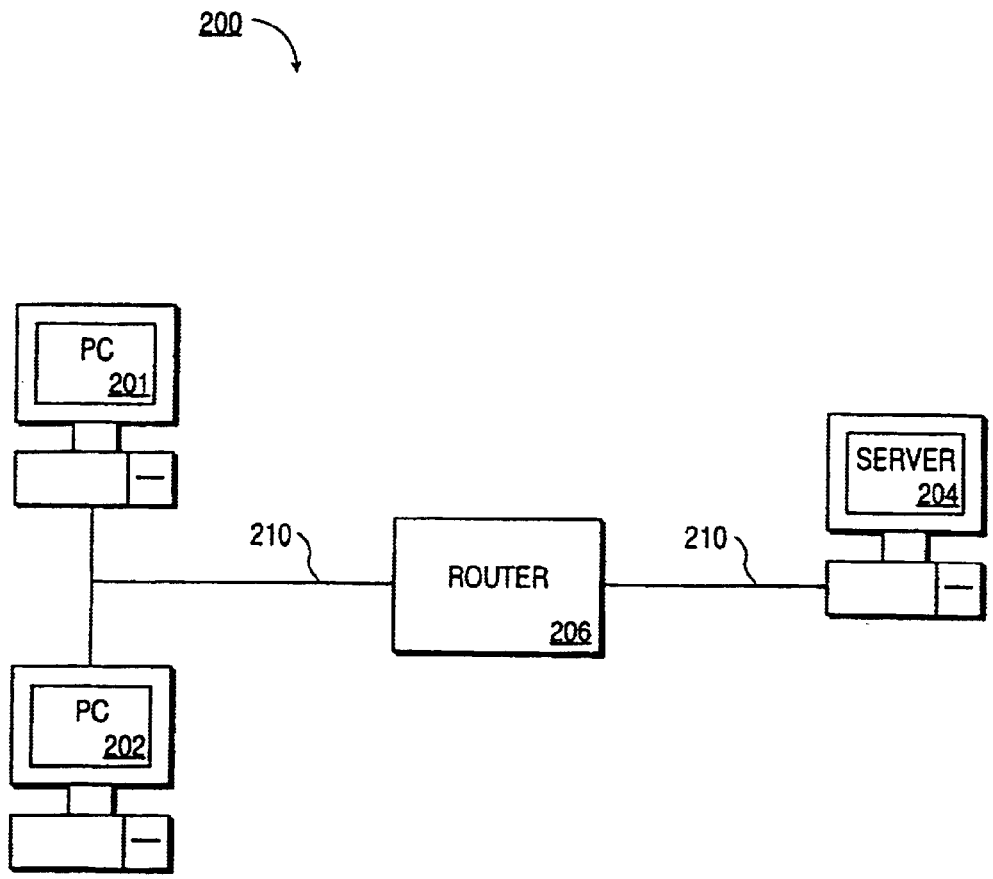
FIG. 2 illustrates network stations which contain network interface devices connected through a network.

FIG. 2 illustrates a network 200 in which secure network management functions are provided by a network interface device according to the present invention. Host computers 201 and 202, which may be conventional personal computers or similar processing machines, are coupled to a network server 204 over network line 210. The network 200 may include one or more routers 206 which serve to buffer and route messages transmitted between the host computers. Each of the devices on the network represents a network station. The network line 210 and router 206 may be utilized by the Internet, a Wide Area Network (WAN), a local area network (LAN), or any combination thereof. The server 204 contains application programs and/or data which are accessible over the network by host computers, such as computers 201 and 202. The host computers may either access the applications directly for execution over the network, or download a copy of the application from the server 204 for local execution. Network traffic consisting of messages and commands are transmitted using the communication protocol specified by the particular network 200. Any of the network stations in network 200 may contain a network interface device which implements the secure network management function of the present invention.

Figure 3:
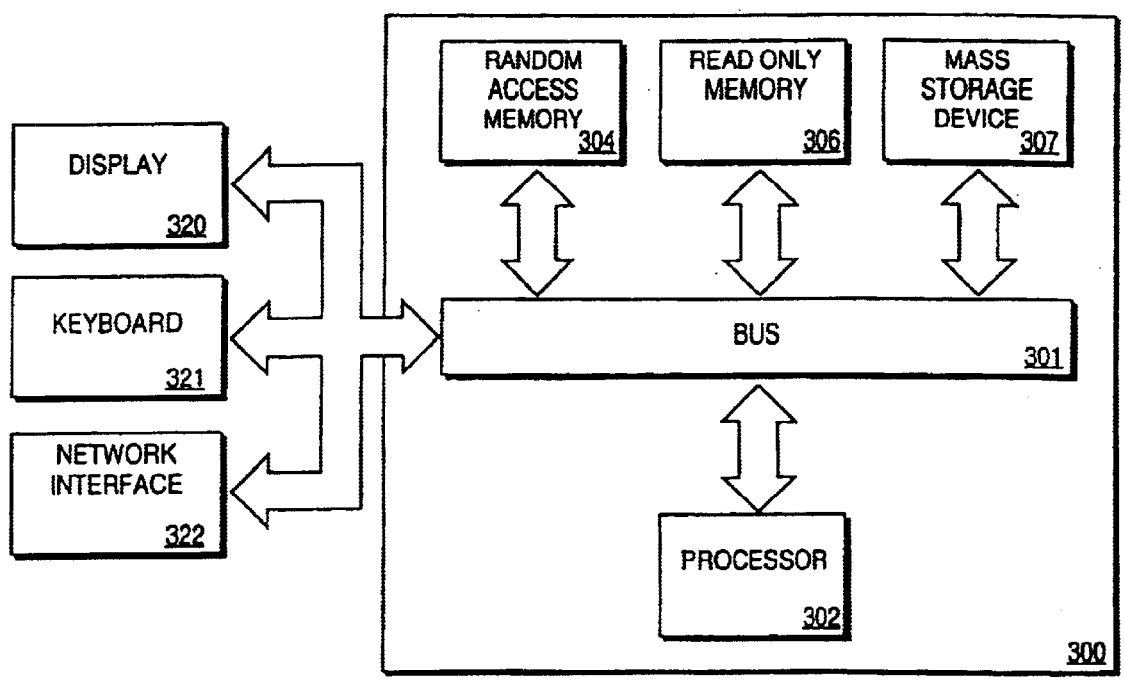
FIG. 3 is a block diagram of a network station which implements a network interface device according to one embodiment of the present invention.

FIG. 3 illustrates a block diagram of a computer system in the network of FIG. 2. The architecture depicted in FIG. 3 is generally applicable to any network station used in conjunction with the present invention, whether it be a router, host computer, or server. The computer system 300 includes a processor 302 coupled through a bus 301 to a random access memory (RAM) 304, a read only memory (ROM) 306, and a mass storage device 307 such as a disk or tape drive for storing data and instructions. An input device 321, such as a keyboard or mouse, is coupled to bus 301 for communicating information and command selections to processor 302. A display device 320 for visual output is also coupled to processor 302 through bus 301. Computer system 300 is connected to a network medium through network interface 322. If computer system 300 is a host computer, network interface 322 typically provides a network connection to a network router, but the interface could also be directly to another host computer. If computer system 300 is a router, network interface 322 provides a network interface to a host computer or another router. Network interface 322 could represent a device such as a modem, Ethernet controller, FDDI interface, or ATM card. Note that the architecture of FIG. 3 is provided only for purposes of illustration, and that a host computer or a router used in conjunction with the present invention is not limited to this specific architecture.

Java Enabled Network Interface Device

In current network stations, the network interface 322 would typically be implemented by the architecture illustrated for network interface device 106 in FIG. 1. According to one embodiment of the present invention, however, network interface 322 provides secure network management through the incorporation of a Java Virtual Machine within a network interface device. The resulting network interface device is referred to as a Java Enabled Network Interface Device. A Java Virtual Machine is an abstract device which describes an environment used to execute Java programs. A Java Virtual Machine provides a Java interpreter and run-time environment on top of processor hardware.

Java is a general purpose, high-level, object-oriented programming language which supports multiple host architectures and allows the secure delivery of software components. Programs written in Java, sometimes referred to as "applets" or "servlets", are compiled into byte-code instructions. Byte-code instructions resemble other instruction sets utilized by computers, but are not hardware specific. A key feature of Java is its security mechanisms. One such mechanism is that methods and variables are accessed by name, rather than address. This allows a verification process to verify that a called routine or variable is correct. Java byte-codes also contain additional information which allows the verification of program legality. Additionally, Java programs are executed in a restricted environment, thus reducing the possibility that Java programs access computer resources other than those they are intended to access. The incorporation of a Java Virtual Machine thus allows a network interface device to safely and reliably contain state information or code that is properly part of the external network and not the local computing device (station). It also allows the network interface device to verify and pass control commands to the host computer which request modification of network functions.

According to one embodiment of the present invention, the sole access to items of security is through a Java value to be restricted to known applets, hosts or services that present valid digital signatures. The local control of the network interface device is implemented with an embedded Java Virtual Machine. It should be noted however, that the present invention may be implemented by embedding other robust environments such as a JavaScript™ environment, or a SafeTcl command interpreter within a network interface device (JavaScript is a trademark of Sun Microsystems). Furthermore, other embodiments of the present invention may utilize secure programming languages other than Java, such as any proprietary scripting language.

Another mechanism ensuring the security of network functions according to one embodiment of the Java Enabled Network Interface Device is that flash memory and other local memory devices utilized by the Java Enabled Network Interface Device are physically separated from the host computer. The Java Virtual Machine performs all negotiation of on-board memory access. When loading JavaOS™ from flash or ROM memory, the boot sequence (boot PROM/initial program load) may perform a secure checksum calculation using a secure hash algorithm (e.g., SHA-1) to prove that the JavaOS code was not modified by anyone other than the owner of the signature on the secure hash. For example, the SHA-1 hash is encrypted with the private key of the manufacturer, such that only the public key of the card manufacturer can unlock the hash value, to be compared with one computed on the fly during an initial program load. JavaOS is a small, self-contained operating system that implements a Java Virtual Machine and network interface, and is designed to run on any processor capable of supporting the Java Virtual Machine, such as a Sun SPARCυ processor or a Sun Java chip javaOS and SPARC are trademarks of Sun Microsystems).

Figure 4:
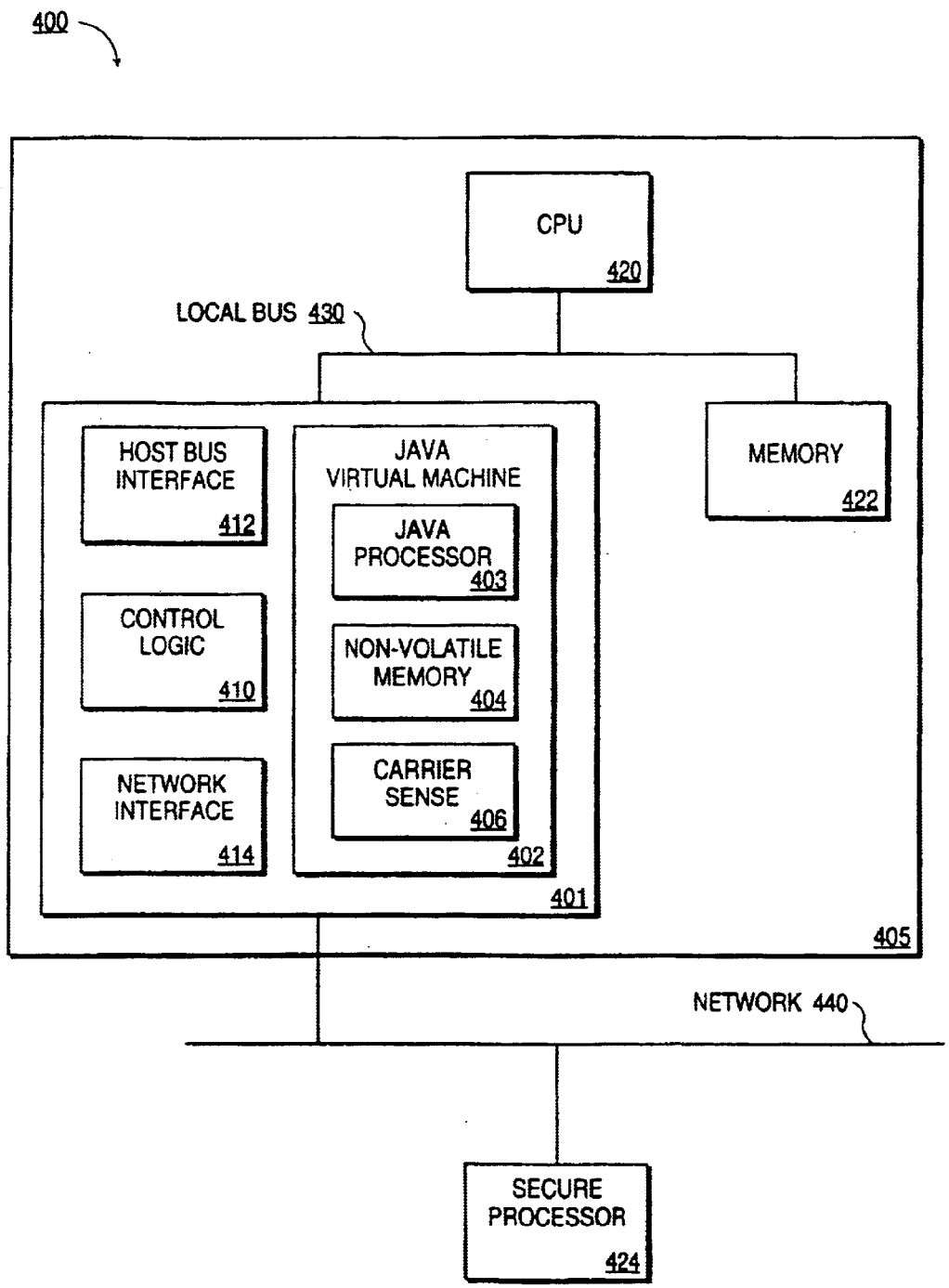
FIG. 4 is block diagram of a network interface device according to one embodiment of the present invention.

FIG. 4 provides a block diagram illustration of a network interface device which incorporates a Java Virtual Machine according to one embodiment of the present invention. In the Java Enabled Network Interface Device, the simple control and physical interface units of a typical network interface device (such as that illustrated in FIG. 1) are replaced with a multi-component interface and control system. System 400 illustrates a Java Enabled Network Interface Device 401 connected to the central processing unit (CPU) 420 and memory 422 of a host computer 405 through local bus 430. Java Enabled Network Interface Device 401 provides a connection from the host computer 405 to the network 440. Network 440 provides the connection between the host computer 405 and a secure processor 424 within a remote server or other network station. As should be apparent to those of ordinary skill in the art, although the Java Enabled Network Interface Device 401 is illustrated in FIG. 4 as being contained within the host computer 405, the Java Enabled Network Interface Device 401 could also be embodied within a device which is separate from host computer 405, but connected to host computer 405 through appropriate wiring, or within a removable card which interfaces to host computer 405 through an expansion port.

The Java Enabled Network Interface Device 401 includes a Java Virtual Machine 402, control logic 412, a host bus interface circuit 410, and a network interface circuit 416. The network interface circuit 416 provides the physical interface to the network 440 and may be implemented by a modem encoder/decoder (CODEC) or Ethernet interface chip, or a similar network device. The control logic 412 controls the transmission of messages between the network 440 and the local bus 430 of the host computer 405, and can be implemented using standard discrete chipsets or other circuit devices. A carrier sense circuit 406, which is controlled by Java Virtual Machine 402, interfaces the physical network interface 416 to the external network 440. The carrier sense circuit detects the presence of a physical network connection, such as a completed telephone call to a modem in answer mode, or an Ethernet connection with clear carrier. The Java Enabled Network Interface Device 401 also includes a volatile memory device 414 which is used as a temporary storage area or "scratch pad". This scratch pad memory provides the local memory requirements of the Java Virtual Machine 402.

The Java Virtual Machine 402 incorporates a Java runtime process on a Java processor circuit 403. The Java processor circuit 403 within the Java Virtual Machine 402 executes Java programs and may be implemented as a microprocessor, such as a Sun SPARC processor, or in programmable logic circuitry such as an ASIC device. The Java Virtual Machine 402 also includes non-volatile memory 404. The Java processor accesses non-volatile memory 404 which stores state information such as objects of value, digital signatures, or encryption keys. Non-volatile memory 404 may be implemented in a memory device such as EEPROM or Flash memory, or any similar device which retains memory in a power down state or when the device is removed from the circuit.

Java Virtual Machine Operation

The Java Virtual Machine 402 is located in the datapath between the physical network interface 416 and the local control logic 412. Any data passing from the host computer 405 to the network 440 may be intercepted, interpreted and processed by the Java Virtual Machine. In this capacity, the Java Virtual Machine acts as an Internet Protocol (IP) level device connected to the host computer 405. By default, any packets passing into the Java Virtual Machine from the host computer 405 are copied to the physical network interface circuit 416. Similarly, inbound packets from the network 440 to the host computer 405 are received by the Java Virtual Machine where they may be processed or transmitted straight through to the local control logic 412. When the carrier sense circuit 406 signals the Java Virtual Machine 402 that there is no longer a valid network connection, the Java Virtual Machine 402 may itself choose to respond to IP packets and generate the correct response packets. Such IP packets could include requests for objects of value, license verification, or other completion messages for a microtransaction.

Figure 5:
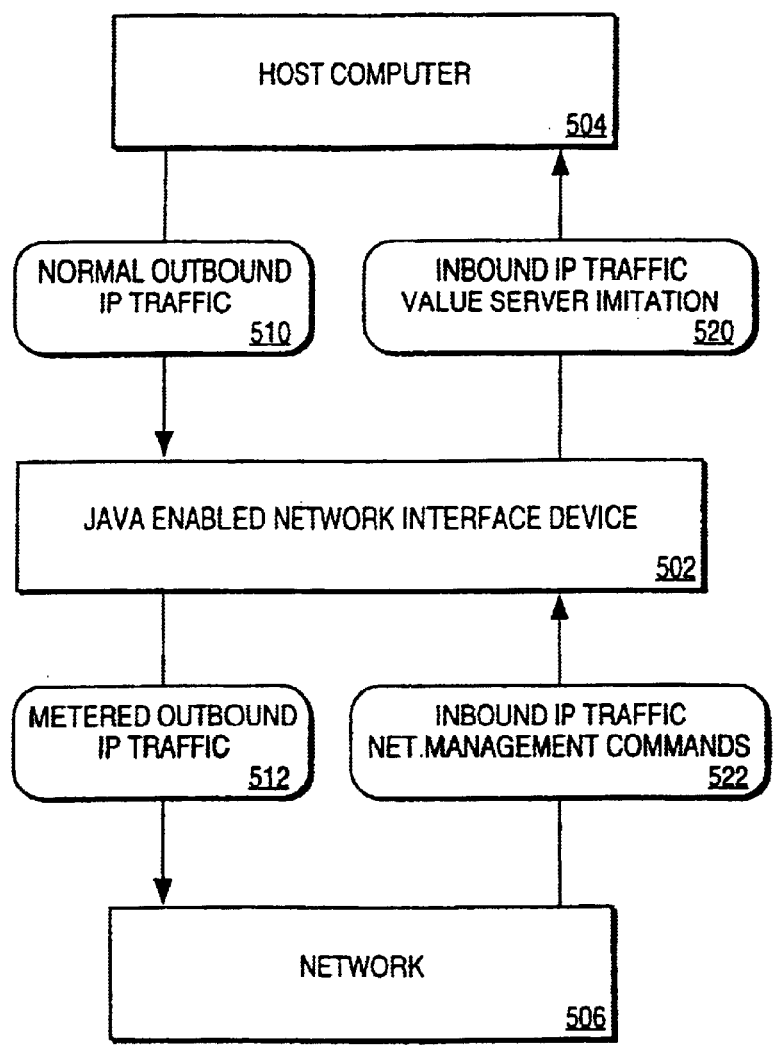
FIG. 5 illustrates the network functionality of the Java Enabled Network Interface Device according to one aspect of the present invention.

FIG. 5 illustrates the network functionality of Java Enabled Network Interface Device according to one embodiment of the present invention. The Java Enabled Network Interface Device 502 interfaces a host computer 504 with network 506. Normal outbound IP traffic 510 generated by the host computer 504 is intercepted by the Java Enabled Network Interface Device 502 and transmitted to network 506 as metered outbound IP traffic 512. Inbound IP traffic 522 transmitted to host computer 504 from network 506 is intercepted by Java Enabled Network Interface Device 502 and passed along to host computer 504 as inbound IP traffic, if secure address filters in the Java Virtual Machine within the Java Enabled Network Interface Device determine that the traffic may be passed through. Certain inbound IP traffic 522 may not be intended to pass through to the host computer 504. Such traffic could include network management commands, such as commands which instruct the Java Enabled Network Interface Device to modify network bandwidth usage. These commands are processed by the Java Enabled Network Interface Device itself. Similarly, certain inbound IP traffic 520 from the Java Enabled Network Interface Device 502 to the host computer 504 may include messages which are provided by the Java Enabled Network Interface Device itself. These messages would be accessible from the host computer 504, even when the host computer 504 is disconnected from network 506, and may include data packets such as objects of value.

The Java Enabled Network Interface Device uses the existing TCP/IP interfaces and does not require any new data link, network or session layer protocols. New applications may be developed and run on the on-board processor 403, such as the Resource Reservation Protocol (RSVP) for pacing and bandwidth allocation, but no new session or lower level protocols are required. The Java Enabled Network Interface Device presents data link frames to the host computer, but may also perform some higher-level processing as well. In one embodiment of the present invention, the DLPI (data link provider interface) specified by SunSoft™ suffices to connect the Java Enabled Network Interface Device to the TCP/IP stack below the IP implementation level (SunSoft is a trademark of Sun Microsystems).

From the perspective of the network, the Java Enabled Network Interface Device is accessed through pre-defined port numbers at the IP address of the host computer. For example, while the sendmail (mail transfer agent) process may be found at port 25 on the host computer, the Java Enabled Network Interface Device will use a similar well-known port number and the IP address of the host computer. These port numbers are accessible to application programs using standard TCP/IP system configuration files, library calls and utilities. Access to the local TCP/IP control functions is handled through additional native methods added to the on-board Java Virtual Machine to provide the ability to add, remove, or modify IP addresses and TCP port numbers that are being "watched" by the Java Enabled Network Interface Device for inbound or outbound traffic. These interfaces will be used, for example, when an object of value is installed from a remote secure host.

According to one embodiment of the present invention, application level code is loaded into the Java Enabled Network Interface Device using the Java Server interface. This interface is well documented by JavaSoft™ and provides a mechanism for secure server-side execution of Java applets (JavaSoft is a trademark of Sun Microsystems). In this regard, the Java Enabled Network Interface Device appears to be a server from the viewpoint of the host computer. The on-board Java Virtual Machine requires only the embedded interfaces for the Java environment. In the case in which the Java Enabled Network Interface Device is implemented without a window system interface, there is no need for components such as the abstract window toolkit (AWT). However, other class libraries, for example, those for electronic commerce, may be added at the discretion of the implementor.

Representation of Network Services

The incorporation of a Java Virtual Machine within a network interface device allows the network interface device of a host computer to securely store state information that is normally stored on remote devices on the network, and not within the host computer. An application running on a host computer may require certain state information from a remote server to allow execution. Typically, the host computer must initiate communication with the remote server over the network and request this information. The security features of the Java Virtual Machine, however, allow this state information to be programmed within the network interface device, and thus the host computer may access this information directly from its network interface device instead of over the network from the remote server. The Java Enabled Network Interface Device thus acts as a proxy for network services.

An example of the representation of network services by the Java Enabled Network Device is the situation in which software is licensed on a metered or pay-per-use basis. In present applications and systems, an object of value, such as a digital cash token or a license token is stored in a remote server and requested by a host computer. This requires a network connection between the host computer and the remote server, as well as the transmission over the network of message packets which may contain confidential and sensitive information.

According to the present invention, as illustrated in FIG. 4, the Java Virtual Machine 402 allows the secure storage of the object of value within the network interface device with security mechanisms that do not allow unauthorized access or tampering of the object of value by the host computer 405. The object of value is stored in the non-volatile memory 404 of the Java Virtual Machine 402. The Java Virtual Machine 402 intercepts the license request, decrements the value of the license token, and returns a positive response if enough value remains or denies the license if the token value is depleted. From the point of view of the local application on the host computer 405, the request was satisfied by a secure, trusted processor 424 or server on the network. This mechanism allows the object of value to be used even when there is no network connection for verification of the license or transfer of funds for payment. In this case, the host computer will be allowed to execute an application program which may be stored on the host computer, but may require an object of value to allow execution. This mechanism also allows the host computer to download an application program from a remote location to be executed on the host computer if an object of value is required to allow the download operation.

The Java Virtual Machine 402 may also be treated as a trusted device on the network for purposes of reloading items of value, for example, resetting the number of uses permitted by a software license. Typically this action would require the host computer 405 to contact a remote server 424 over the network 440 to access a data store which contains a license counter. With the Java Virtual Machine 402, however, this action may be initiated by a Java applet running entirely within the Java Virtual Machine 402, or by a Java servlet running in the Java Virtual Machine 402 talking to a Java applet running at user level on the host computer 405. For example, a user acquiring a right-to-use via telephone (with credit card payment) would receive an encrypted string to be presented to the Java Virtual Machine servlet. In this process, the user on the host computer 405 loads the local web page containing the Java applet with the payment/update protocol in it; the local applet contacts the Java servlet in the Java Virtual Machine 402 using standard TCP/IP messages. Upon verification of the encrypted string by the Java servlet, the Java Virtual Machine 402 updates any local states such as an object of value, digital cash token, or license token.

Figure 6:
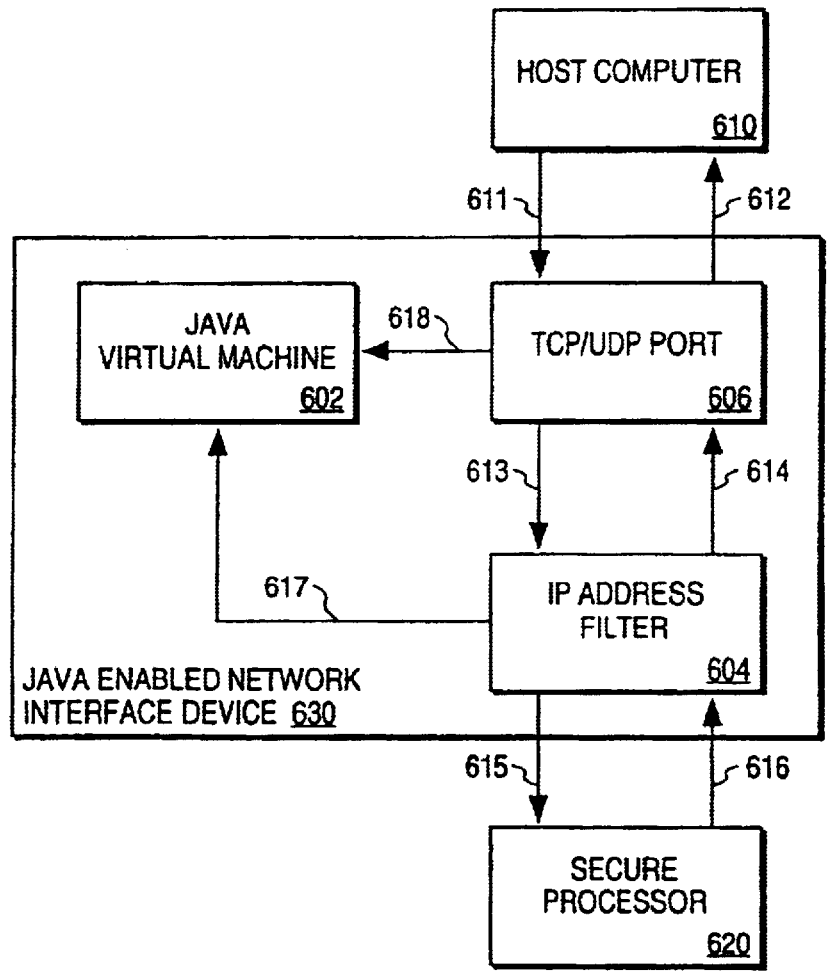
FIG. 6 illustrates the representation of network services by the Java Enabled Network Interface Device according to one aspect of the present invention.

FIG. 6 illustrates the operation of the Java Enabled Network Interface Device during representation of network services according to one aspect of the present invention. The Java Enabled Network Interface Device 630 monitors inbound network traffic 616 and outbound network traffic 611 between host computer 610 and secure processor 620.

Inbound traffic 616 directed to a Java applet in the Java Virtual Machine 602 is copied from the inbound IP stack to the Java Virtual Machine, and is not passed up to the host computer 610 through TCP port 606. This decision is made by examining the IP address and port number of each incoming packet in an IP address filter 604, or by looking for address/port pairs that match the "watchlist" established by locally installed objects of value. The technique for building and maintaining such a watch list is the same used for multiple, virtual IP addresses on a single network interface, or the management of Class D multicast addresses. The IP address filter 604 communicates to the TCP port 606 through input line 613 and output line 614, and to the Java Virtual Machine 602 through line 617. Inbound traffic 616 which is not directed to the Java Virtual Machine 602 is passed to host computer 610 over inbound line 612.

Outbound traffic 611 from host computer 610 destined for well-known licensing servers or other secure servers may be captured and replied to by the Java Enabled Network Interface Device 630, depending on the current state of the network connection. Under normal circumstances, the outbound traffic 611 is copied to the outbound physical network and transmitted over line 615. However, during operation in which the host computer 610 is disconnected from the network, traffic destined for servers represented by locally installed objects of value is directed to the Java Virtual Machine 602 over line 618, while other traffic is discarded.

Figure 7:
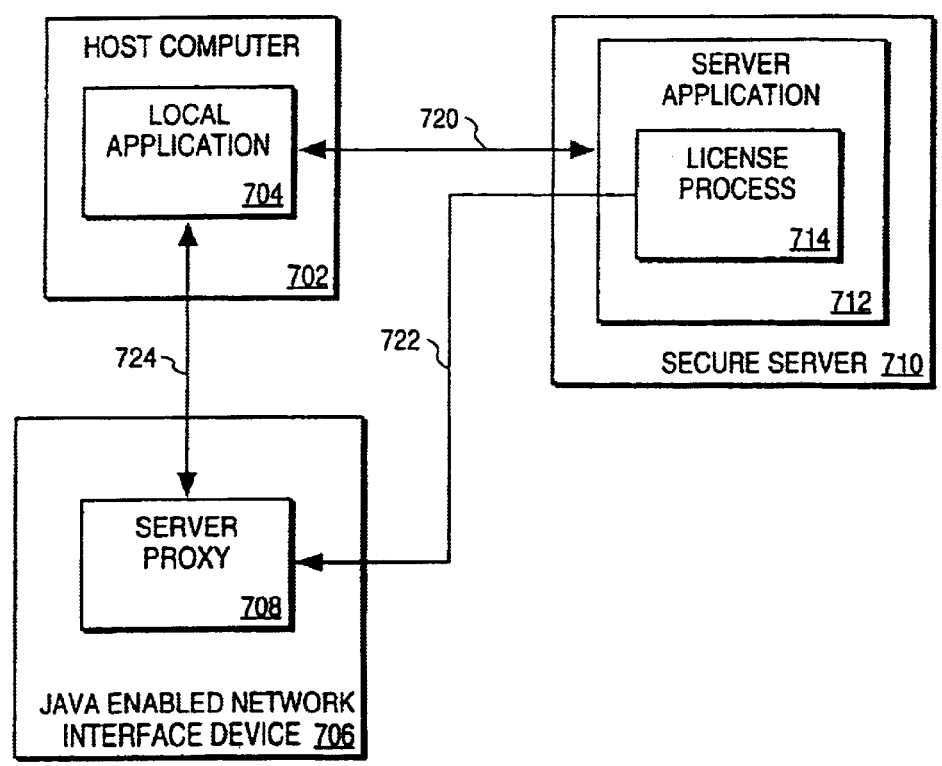
FIG. 7 illustrates the installation of objects of value according to one embodiment of the present invention.

FIG. 7 is a block diagram which illustrates the process of installing object of value in the Java Enabled Network Interface Device according to one embodiment of the present invention. To create an object of value on the Java Enabled Network Interface Device 706, a Java applet representing the value, location, and increment/decrement function of the object of value, is loaded into the Java Virtual Machine as a server proxy 708 directly from the inbound network connection 722. The object of value is initially available from a license process 714 within a server application 712 running on a secure server 710. Normal network traffic is transmitted between the secure server 710 and the host computer 702 over line 720. However traffic generated by the server proxy 708 is transmitted to host computer 702 from the secure server 710 over line 722 and line 724.

In the Java Virtual Machine, object of value applets are loaded into flash memory, so that they will remain in place after a power cycle or machine reboot. A listener applet running in the Java Virtual Machine awaits a connection on a well-known TCP port number, and any incoming traffic to that port is taken to be a serialized Java applet that may be installed in the Java Virtual Machine. Once installed, that Java applet may listen on other TCP ports for other methods (actions), such as increasing the value, decrementing the value or marking the object of value invalid. To be secure, the Java applet downloaded in such fashion must be digitally signed, and the local Java Virtual Machine must recognize the signature as that of a valid software vendor or local application provider. Once the applet is running, it may choose to listen at the IP address of the host that provided it, using any arbitrary TCP port number. For example, if a host computer downloads a digital token dispenser for an interactive game from host A, the Java applet for the token dispenser will reside in the local Java Virtual Machine, listening for requests destined for port P on host A.

In this process, the local Java applet is playing the role of a proxy for the remote server, monitoring and responding to specific requests of that server as if they had gone over the network and returned from the server. Any permanent state, such as the residual value in the token dispenser, may be kept in Java variables, since the Java class, including data and instructions which implement the object of value, is stored in flash memory while it is in use. Updates to the stored value (such as token consumption for game-playing will be stored in flash memory as well, transparently to the Java applet. Because the locally installed Java applet represents the secure, remote network server typically used for software licensing, the desktop or portable computer with a Java Enabled Network Interface Device installed may continue to use licensed or per-use charge software while disconnected from the network. In this case, operation continues as explained above, however, network traffic that is not intercepted for use on the Java Enabled Network Interface Device will be discarded.

In an alternative embodiment of the present invention, the Java Enabled Network Interface Device may be configured to contain several tokens or rights to use, each assigned to a different user or account. This mechanism provides for the implementation of per-user authentication from multiple users without requiring a removable, per-user device, such as a 'smart card'. In this implementation, several users, each with their own access code stored as a digital signature can securely access an application on the host computer. This mechanism also allows the downloading of several rights to use which allow the user to access services for a period of time from a remote location or when the host computer will be disconnected from the network for a period of time.

Figure 8:
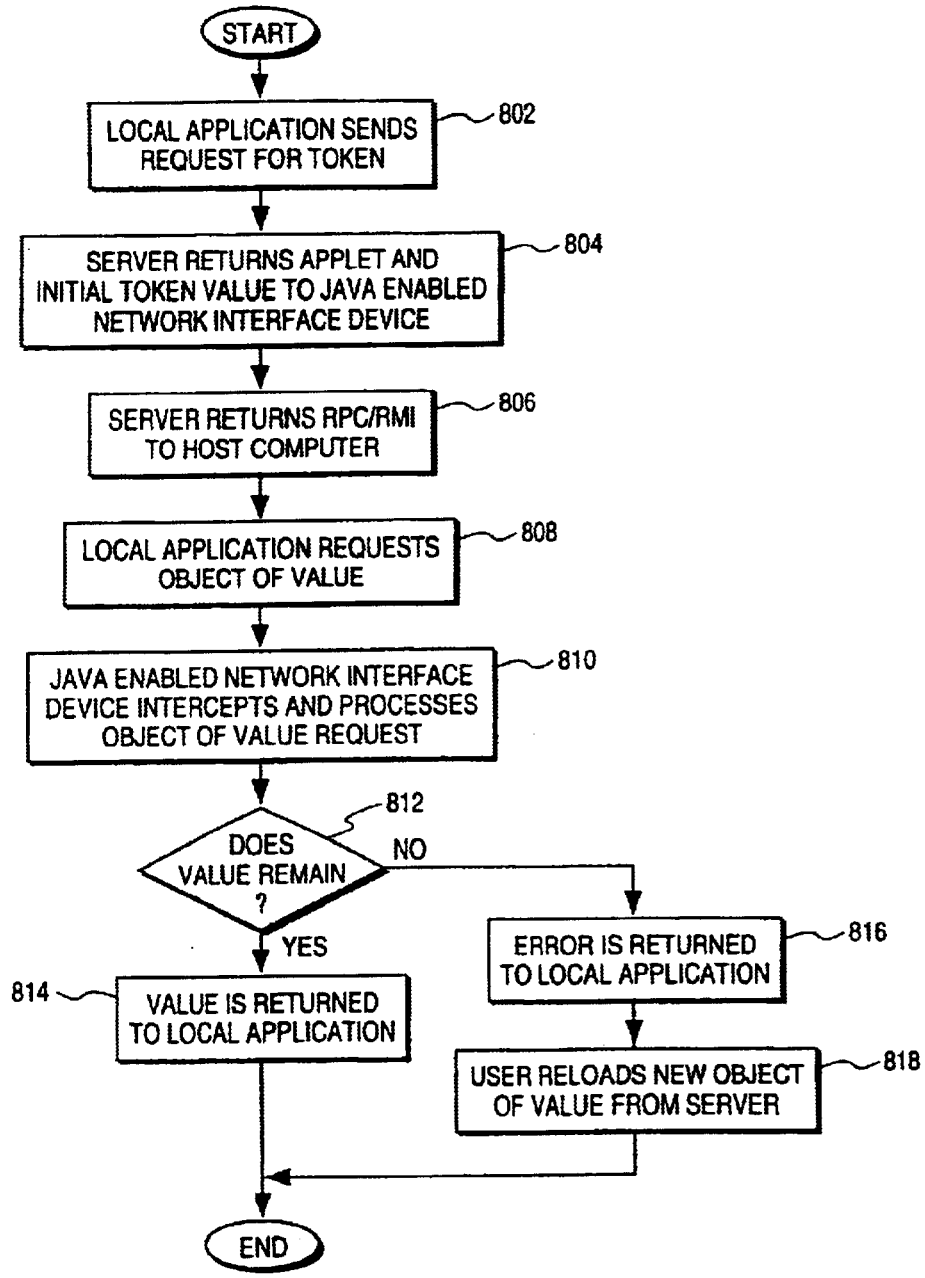
FIG. 8 is a flowchart illustrating the installation of an object of value according to one embodiment of the present invention.

FIG. 8 is a flowchart which represents the process of installing an object of value according to one embodiment of the present invention in relation to the block diagram of FIG. 7. In step 802, an application 704 running on the native operating system of the host computer 702 requests a license/token from an application 712 running on a secure remote network server 710. In response, the server 710 sends an applet representing the object of value with an initial valuation, step 804. This return message is directed to the Java Virtual Machine input port on the Java Enabled Network Interface Device 706 using the IP address of the host computer 702. The server then responds to the host computer's original request for an initial license/token, sending the response back to the requesting port number so that the user-level application may continue processing, step 806. In step 808, the local application 704 on the host computer 702 requests the object of value. This request is intercepted by the Java Enabled Network Interface Device, step 810.

The process of FIG. 8 continues with a check of the value of the object of value in the Java Virtual Machine once the Java Virtual Machine has intercepted the object of value request, step 812. If value remains on the object of value, the value is returned to the local application and the user is allowed to execute the application, step 814. However, if the object of value has no value remaining, an error is returned to the local application, step 816. At that point, the user must reload a new object of value from the server 710, step 818. Alternatively, when the object of value reaches zero stored value, the Java Virtual Machine may automatically contact the secure server 710 and request additional value to be downloaded. This communication may occur transparently to the host computer 702 and any local application 704.

Secure In-Band Network Management

State information stored within the non-volatile memory 404 of the Java Virtual Machine 402 allows the Java Enabled Network Interface Device 401 to be remotely controlled by devices on the network, such as secure processor 424. Network interface devices within computers and routers on a network may contain configuration information or parameters relating to network management, such as routing addresses and resource allocation parameters. Typically, only the host computer communicating through a network interface device can exercise configuration control over that network interface device. This prevents unauthorized control of a computer's network interface device by other devices on the network. The security features of the Java Virtual Machine, however, allow configuration control information to be programmed within the network interface device. This provides a mechanism by which the network interface device may be securely accessed by devices authorized to send control messages to the network interface device.

An example of the network control allowed by the Java Enabled Network Interface Device is the situation in which a remote server requires a bandwidth auction or usage enforcement of nodes on the network. In such a case, the network server may request that nodes on the network reduce their bandwidth usage to accommodate priority traffic from the server. In present applications and systems, a network interface device embedded within or closely coupled to a host computer can be controlled through command messages only by that host computer. This requires that the host computer be requested to send appropriate command messages by remote network devices which desire a configuration change in the network interface of the host computer.

According to one embodiment of the present invention, as illustrated in FIG. 4, the Java Virtual Machine 402 allows the secure storage of the encryption or digital signature objects within the Java Enabled Network Interface Device 401 with security mechanisms that do not allow unauthorized access or tampering of the security objects by the remote devices on the network. The security object is stored in the non-volatile memory 404 of the Java Virtual Machine 402. The Java Virtual Machine 402 intercepts a control request and verifies the digital signature or encryption key. If the signature or key is valid, the Java Virtual Machine 402 either processes the message or transmits the message to the local bus 430 of the host computer 405 depending on the internal circuitry of the network interface device. If the Java Enabled Network Interface Device 401 contains circuitry that is accessible from the network, the control message sent from the remote server may directly control resources within the Java Enabled Network Interface Device 401. Such resources could include buffer memory, routing tables, or packet scheduling processes If the Java Enabled Network Interface Device 401 is a transparent device, the control messages are passed through to the host computer 405 by the Java Enabled Network Interface Device 401, and CPU 420 of the host computer 405 issues the appropriate commands to the Java Enabled Network Interface Device 401.

Figure 9:
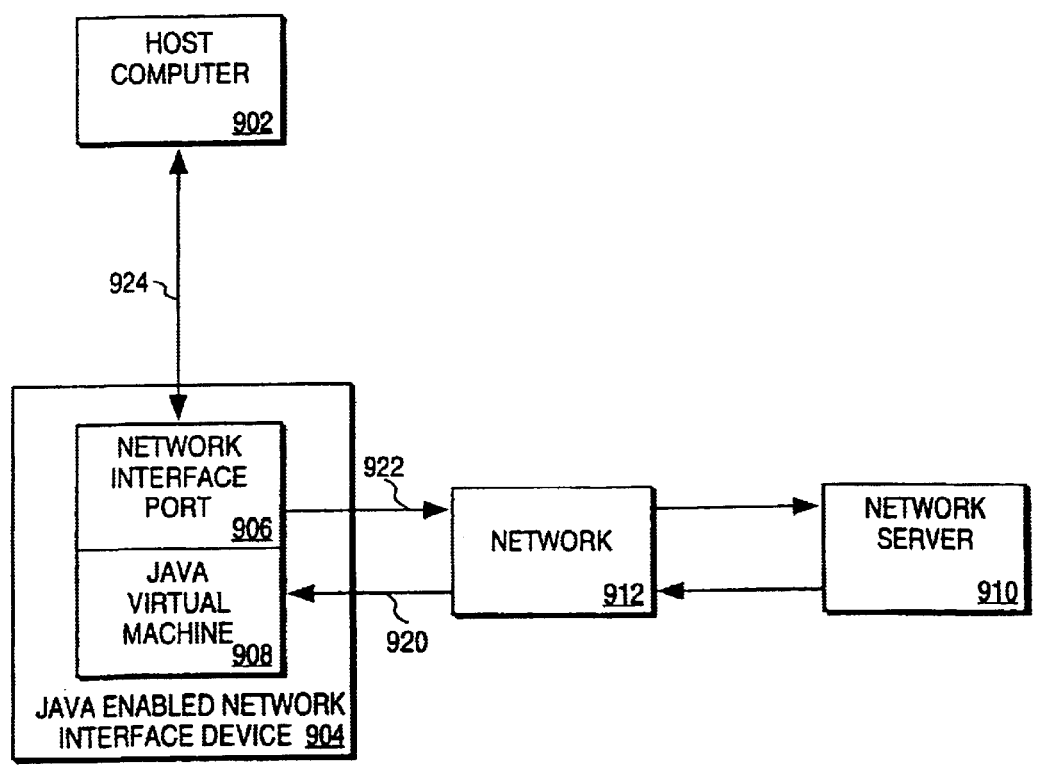
FIG. 9 illustrates the provision of remote network control according to one embodiment of the present invention.

FIG. 9 is a block diagram which illustrates the process of providing network control in the Java Enabled Network Interface Device according to one embodiment of the present invention. In FIG. 9, a network server 910 issues network management commands over network 912 to host computer 902. The Java Enabled Network Interface Device 904 coupled between host computer 902 and network 912 intercepts these commands through Java Virtual Machine 908. If the network commands are verified as originating from a valid and recognized secure server, the Java Virtual Machine 908 implements the command by appropriately controlling the network interface port 906 within the Java Enabled Network Interface Device 904.

Figure 10:
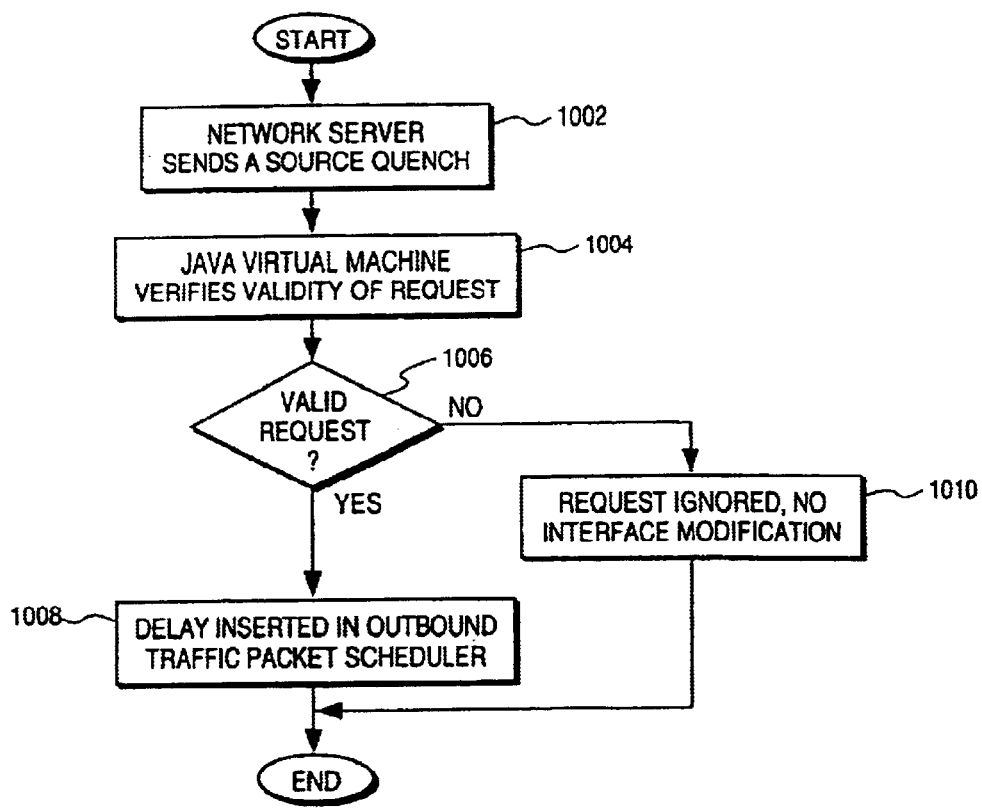
FIG. 10 is a flowchart illustrating the process of executing a remote network control command according to one embodiment of the present invention.

FIG. 10 is a flowchart which represents the process of executing a network control command according to one embodiment of the present invention in relation to the block diagram of FIG. 9. In this example, the network server 910 issues a request to the host computer 902 to quench its network transmission in order to reduce network congestion. In step 1002, server 910 sends the source quench request to the host computer 902. The request is intercepted by the Java Virtual Machine 908 which verifies the validity of the request by checking a digital signature encoded within the request, step 1004. If the request is valid, step 1006, the appropriate steps are taken within the Java Enabled Network Interface Device to quench the output DP traffic. In the case of a source quench command, such action could involve causing a packet scheduler in the output port of the Java Enabled Network Interface Device to insert a delay routine between the packet transmissions, step 1008. If the request is invalid, the request is ignored, step 1010.

Besides controlling bandwidth usage, other remote network management commands may be executed in accordance with the teachings of the present invention. Depending on the resources and processes within the Java Enabled Network Interface Device which are accessible and controllable from the network, a secure remote server may issue network management commands which specify a quality of service to be provided by the host computer, alter the routing of messages transmitted to the host computer, or totally quench the traffic generated by the host computer.

It will be appreciated that other applications relating to secure in-band network management and within the scope of the present invention, other than those explicitly listed herein will be apparent to those of ordinary skill in the art.

Configuration and Operation

According to one embodiment of the present invention, the Java Enabled Network Interface Device is implemented within a network interface device which functions as a simple network interface if installed and powered-up in a default state with no further configuration in such an un-configured state the Java Enabled Network Interface Device does not provide any secure network functions, but does provide network interface functionality at the DLPI level.

According to this embodiment of the present invention, full installation of the Java Enabled Network Interface Device requires the creation of a cryptographic key to be stored on the device. One key may be created for each potential user of the host computer on which the device is installed. This allows the Java Enabled Network Interface Device to be functional in environments where the host computer is to be shared, and allows multiple user to authenticate themselves without requiring additional hardware. Cryptographic keys are created and installed in non-volatile memory 404. The host computer configuration data, such as IP address, assigned port numbers, hardware address, and initial service configuration, are downloaded to the Java Enabled Network Interface Device. Also downloaded are the locations of the network code specific counters, timers and other configuration parameters which may be controlled or updated by the Java Enabled Network Interface Device.

Once the Java Enabled Network Interface Device is properly configured and installed, a system power-on, system reset or input/output bus reset causes the Java Enabled Network Interface Device to complete a power-on reset and configuration process. This process could involve loading JavaOS from on-board non-volatile memory, verify the contents of the non-volatile memory, build a list of inbound IP address/port number pairs to monitor, build a list of outbound IP address/port numbers to monitor, and begin packet filtering at the IP level. Configuration can be completed by the authentication of the user using a user-level process/task. In response to a password or identification string typed by the user in response to a prompt, the Java Enabled Network Interface Device unlocks the per-user cryptographic key.

The configuration and operation procedures provided above are intended to serve as an example of the use of the Java Enabled Network Interface Device according to one embodiment of the present invention. It should be noted that several other configuration and installation methods are possible depending upon the actual implementation of the secure network management functions disclosed in the present invention.

Figure 11:
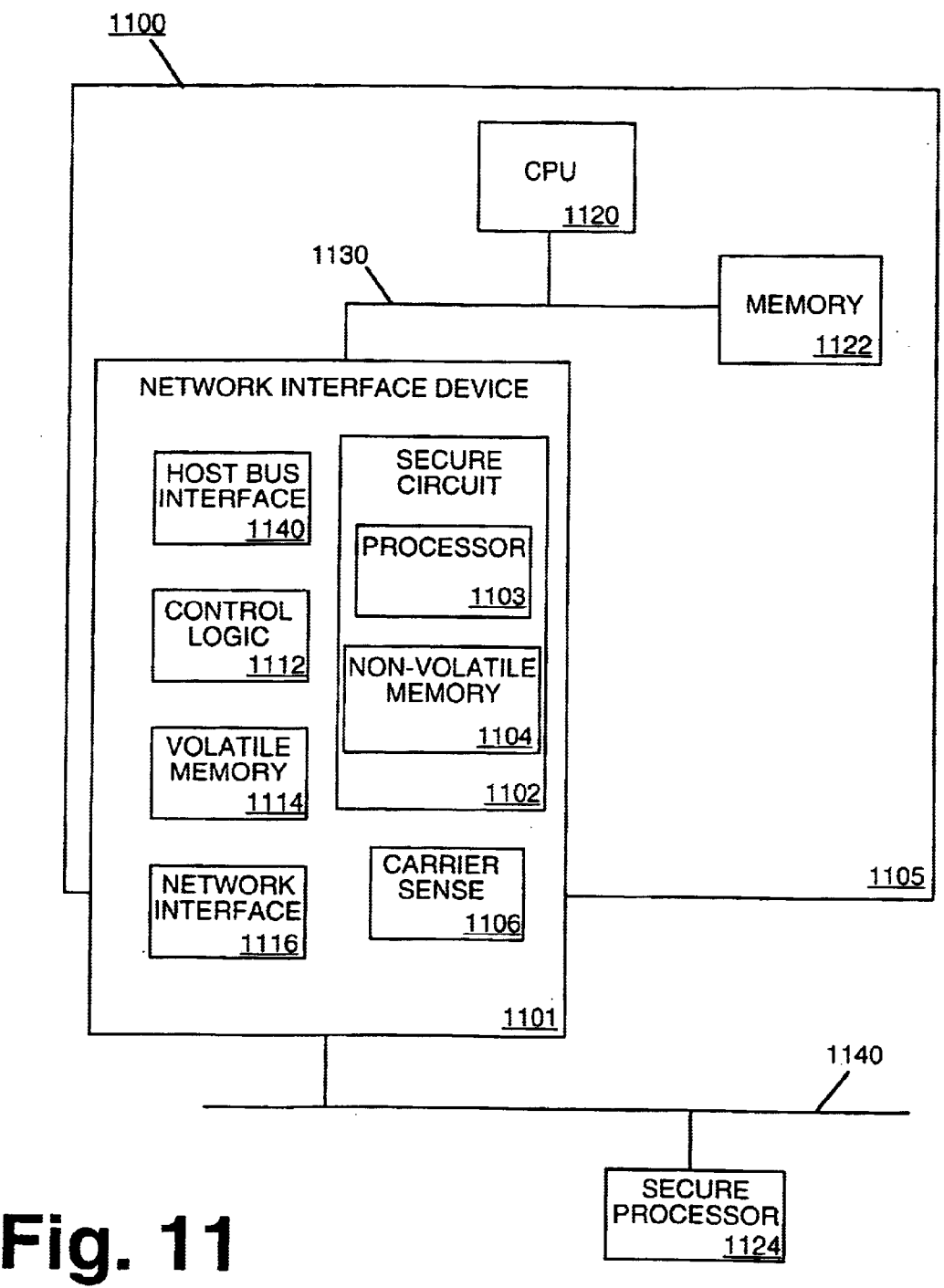
FIG. 11 is a block diagram illustrating the remote network.

FIG. 11 is a block diagram illustration of a network interface device in an alternate embodiment of the invention which incorporates a secure circuit 1102 instead of the Java Virtual Machine. In a Network Interface Device, the simple control and physical interface units of a typical network interface device (such as that illustrated in FIG. 1) are replaced with a multi-component interface and control system. System 1100 illustrates a Network Interface Device 1101 connected to the central processing unit (CPU) 1120 and memory 1122 of a host computer 1105 through local bus 1130. Network Interface Device 1101 provides a connection from the host computer 1105 to the network 1140. Network 1140 provides the connection between the host computer 1105 and a secure processor 1124 within a remote server or other network station. As should be apparent to those of ordinary skill in the art, although the Network Interface Device 1101 is illustrated in FIG. 1 as being contained within the host computer 1105, the Network Interface Device 1101 could also be embodied within a device which is separate from host computer 1105, but connected to host computer 1105 through appropriate wiring, or within a removable card which interfaces to host computer 1105 through an expansion port.

The Network Interface Device 101 includes a secure circuit 1102, control logic 1112, a host bus interface circuit 1110, and a network interface circuit 1116. The network interface circuit 1116 provides the physical interface to the network 1140 and may be implemented by a modem encoder/decoder (CODEC) or Ethernet interface chip, or a similar network device. The control logic 1112 controls the transmission of messages between the network 1140 and the local bus 1130 of the host computer 1105, and can be implemented using standard discrete chipsets or other circuit devices. A carrier sense circuit 1106, which is controlled by secure circuit 1102, interfaces the physical network interface 1116 to the external network 1140. The carrier sense circuit detects the presence of a physical network connection, such as a completed telephone call to a modem in answer mode, or an Ethernet connection with clear carrier. The Network Interface Device 1101 also includes a volatile memory device 1114 which is used as a temporary storage area or "scratch pad". This scratch pad memory provides the local memory requirements of the secure circuit 1102.

The secure circuit 1102 incorporates a run-time process on a processor circuit 1103. The processor circuit 1103 within the secure circuit 1102 executes programs and may be implemented as a microprocessor, such as described below, or in programmable logic circuitry such as an ASIC device with appropriate security features. The secure circuit 1102 also includes non-volatile memory 1104. The processor accesses non-volatile memory 1104 which stores state information such as objects of value, digital signatures, or encryption keys. Non-volatile memory 1104 may be implemented in a memory device such as EEPROM or Flash memory, or any similar device which retains memory in a power down state or when the device is removed from the circuit.

Secure Circuit 1102 Operation

The secure circuit 1102 is located in the datapath between the physical network interface 1116 and the local control logic 1112. Any data passing from the host computer 1105 to the network 1140 may be intercepted, interpreted and processed by the secure circuit. In this capacity, the secure circuit acts as an Internet Protocol (IP) level device connected to the host computer 1105. By default, any packets passing into the secure circuit from the host computer 1105 are copied to the physical network interface circuit 1116. Similarly, inbound packets from the network 1140 to the host computer 1105 are received by the secure circuit where they may be processed or transmitted straight through to the local control logic 1112. When the carrier sense circuit 1106 signals the secure circuit 1102 that there is no longer a valid network connection, the secure circuit 1102 may itself choose to respond to IP packets and generate the correct response packets. Such IP packets could include requests for objects of value, license verification, or other completion messages for a microtransaction.

Secure Circuit 1102 Implementation

Secure circuit 1102 may be implemented such that processor 1103 and non volatile memory 1104 are embodied in secure microprocessor chip such as a DS5002FP available from Dallas Semiconductor. In this manner, rather than using a secure programming language such as Java, the security features of the invention are obtained by virtue of the program code and data residing in secure microprocessor chip. In this manner, secure circuit 1102 can be programmed to perform the functions of the Java virtual machine as described above such that Network Interface Device 1101 performs the functions of the Java enabled network interface device described above.

In the foregoing, a mechanism for embedding a secure network management function within a local network interface device has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus to provide a proxy for network services of a secure station connected to a network to a host station, said apparatus comprising:
   a bus interface circuit coupled between said host station and said network;
   a security circuit coupled to said bus interface circuit, said security circuit including a processor;
   a memory coupled to said processor, said memory to contain parameter information utilized by said network services, said security circuit to allow said parameter information from said network to be stored in said memory, said security circuit to allow authorized access to said parameter information by said host station without network communication between the host station and the secure station; and
   a carrier sense circuit coupled to said bus interface circuit detecting a disconnection of said host station from said network.

2. The apparatus of claim 1 wherein:
   said network service comprises a verification routine executable by said processor; and
   said security circuit to transmit a first set of commands to said host station if said verification routine returns a first value when executed by said processor, said first set of commands to enable said first station to execute an application program executable by said first station, said verification routine to utilize said parameter information contained in said memory.

3. The apparatus of claim 2 wherein said parameter information includes a counter to store a counter value and said verification routine comprises an authentication routine to verify the identity of a user of said host station, said verification routine further comprising a decrement routine to decrement the value of said counter value.

4. The apparatus of claim 3 wherein said authentication routine further includes a plurality of identification parameters, each of said identification parameters to verify the identity of one of a plurality of users of host first station.

5. The apparatus of claim 2 wherein said security circuit to transmit said first set of commands to said first station if said verification routine returns said first value, and said security circuit to transmit a second set of commands to said first station if said verification routine returns a second value.

6. The apparatus of claim 2 wherein said security circuit to transmit said first set of commands to said first station if said verification routine returns said first value and said first station is disconnected from said network.

7. The network interface device according to claim 1 wherein said secure security circuit to provide said secure network management services even when said network is disconnected from said host computer.

8. An apparatus to provide access to network interface functions of a secure station connected to a network to a host station, said apparatus comprising:
   a bus interface circuit coupled between said host station and said network;
   a processor disposed within a secure circuit and coupled to said host station; and
   a memory coupled to said processor, said memory to contain parameter information utilized by said network interface functions, said processor to allow said parameter information from said network to be stored in said memory, said processor to allow authorized access to said parameter information by said host station without network communication between the secure station and the host station.

9. The apparatus of claim 8 further comprising a verification circuit coupled to said processor, said verification circuit to verify access privileges of said host station by comparing a station identification data string contained within an access request message sent by said host station with said parameter information contained in said memory.

10. The apparatus of claim 8 wherein said network interface functions include network bandwidth utilization.

11. A method of providing secure network management functions within a network interface device, said network interface comprising a memory, a processor, and a bus interface circuit, said bus interface circuit coupling said first network station to a network, said network coupled to a second network station, said method comprising the steps of:
   storing a first parameter in said memory;
   storing a security routine in said memory, said security routine comprising instructions and one or more data objects, said security routine containing a second parameter;
   causing said processor to execute said security routine;
   transmitting a first set of commands to said first network station if said security routine returns a first value; and
   transmitting a second set of commands to said first network station if said security routine returns a second value said processor allowing said data objects from said network to be stored in said memory, said processor denying access to said data objects by said first network station.

12. The method of claim 11 wherein:

said first parameter comprises a data string corresponding to the identity of a user of said first network station, and one of said one or more data objects comprises a counter;
wherein the step of causing said processor to execute said security routine further comprises the steps of:
verifying the identity of said user by comparing a character string input by said user to said first parameter,
checking a value associated with said counter,
decrementing said counter if said value exceeds a threshold value, and
issuing an authorization command allowing the transmission of said first set of commands if said counter exceeds said threshold value and said character string matches said first parameter.

13. The method of claim 12 wherein said first set of commands to cause said network interface device to modify usage of said network.

14. The method of claim 11 wherein said first set of commands causes said first network station to execute an application program executable by said first network station.

15. The method of claim 11 wherein said first parameter comprises a data string corresponding to the address of an authorized network station, and wherein the step of causing said processor to execute said security routine further comprises the steps of:

verifying the authority of a network station requesting access by comparing said first parameter with a character string transmitted by said network station requesting access; and issuing an authorization command allowing the transmission of said first set of commands if said character string matches said first parameter.

* * * * *